Jan. 29, 1963     H. KELLEY     3,075,660
VEHICLE DUMPING APPARATUS
Filed Aug. 24, 1960     4 Sheets-Sheet 1

INVENTOR.
HUGH KELLEY
BY
Harold B. Hood
ATTORNEY

Jan. 29, 1963   H. KELLEY   3,075,660
VEHICLE DUMPING APPARATUS
Filed Aug. 24, 1960   4 Sheets-Sheet 3

INVENTOR.
HUGH KELLEY
BY
Harold B. Hood
ATTORNEY

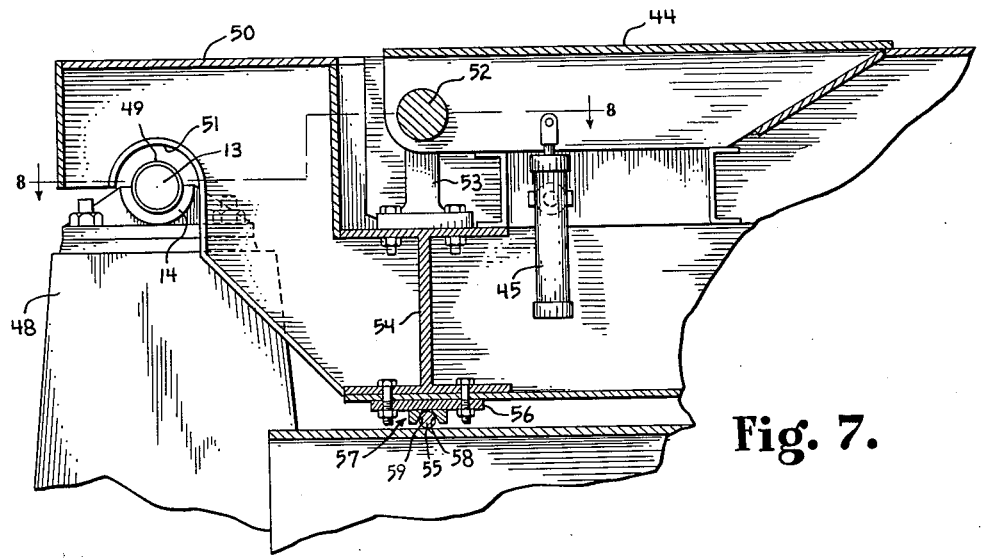
Fig. 7.
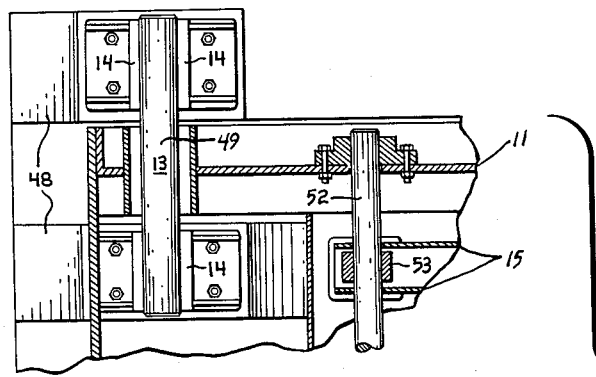
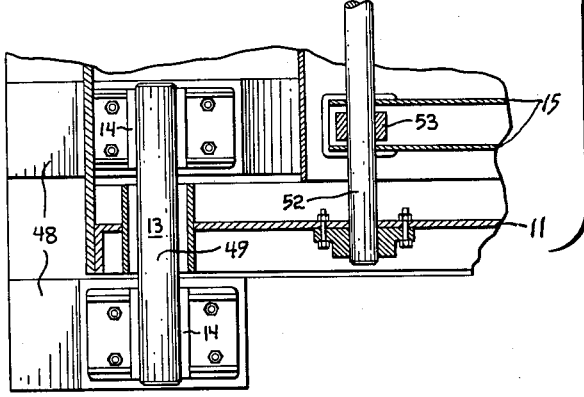
Fig. 8.
INVENTOR.
HUGH KELLY
BY Harold B. Hood
ATTORNEY

United States Patent Office 3,075,660
Patented Jan. 29, 1963

3,075,660
VEHICLE DUMPING APPARATUS
Hugh Kelley, Enterprise, Kans., assignor to The J. B.
Ehrsam & Sons Manufacturing Company, Enterprise,
Kans., a corporation of Kansas
Filed Aug. 24, 1960, Ser. No. 51,574
13 Claims. (Cl. 214—49)

The present invention relates to a vehicle dumping apparatus, and is primarily concerned with that type of equipment in which a vehicle-supporting platform is so supported adjacent a receiver such as a hopper, bin, conveyor or the like that, with a vehicle supported on the platform, that end of the platform remote from the receiver may be lifted to dump the vehicle load to the receiver.

The primary object of the invention is to provide improved means for thus swinging the platform.

Another major object of the invention is to provide novel mounting means for such a platform of such character that the platform may normally rest wholly upon bed means such as, for instance, a weighing scale bed, entirely out of contact with any hinging or lifting means, and yet, when lifted into vehicle-dumping position, will be supported wholly independently of such bed means.

A still further object of the invention is to provide a mounting means for such a platform of such character that, when the platform is returned from vehicle-dumping position to normal position, it will automatically assume such a relationship to its associated elements that, when its said remote end is again lifted, the hinge support for the platform end adjacent the receiver will unfailingly be automatically established.

Another object of the invention is to provide a novel hinge support for the receiver end of the platform of such character as to guard against the accumulation of foreign matter within the hinge mounting.

A further important object of the invention is to provide platform-actuating means of such character that, when the platform is in its normal or vehicle-receiving position, the actuating means is completely disconnected from the platform.

A still further object of the invention is to provide, in conjunction with such a platform and actuating means, an auxiliary platform inset within the main platform and swingable, independently of the main platform, about a hinge axis closely adjacent the receiver. A still further object of the invention is to provide, in apparatus of the character last described, actuating means for the auxiliary platform supported from the main platform.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

FIG. 7 is a fragmentary, longitudinal section drawn to an enlarged scale to show details of the alternative modes of support of the main platform; and FIG. 8 is a fragmentary, horizontal section, drawn to a slightly reduced scale relative to FIG. 7, and taken substantially on the line 8—8 of FIG. 7.

Figure 1:
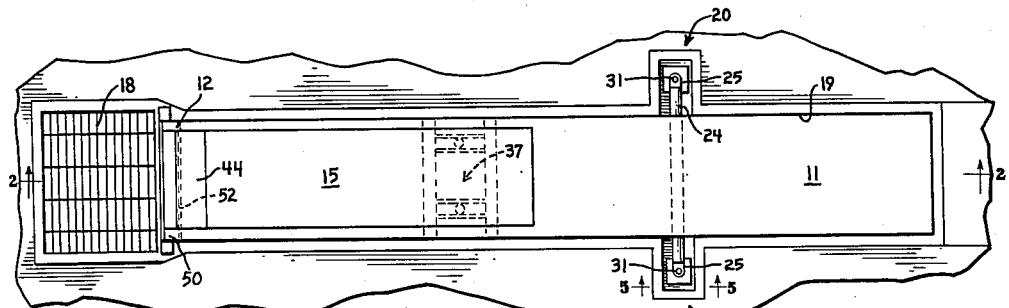
FIG. 1 is a plan view of a preferred form of vehicle dumping apparatus constructed in accordance with the present invention.

Referring more particularly to the drawings, it will be seen that I have illustrated a bed 10 which may, if desired, be the bed of a weighing scale (not shown in detail) or may be a stationary bed. A platform 11 proportioned and designed to receive and support a vehicle of any predetermined size and character, is substantially coextensive with the bed 10 and is adapted to rest thereon.

Adjacent one end 12 of the platform 11, but between said platform end and receiver means indicated generally by the reference numeral 17, trunnion means 13, 13 is suitably supported, independently of the bed 10 and of the platform 11, upon a horizontal axis transverse with respect to the length of the bed and platform. In the illustrated embodiment of the invention, such trunnion means comprises the two coaxial, laterally-spaced rods 13, 13, each supported, in a pair of cups 14, 14, from a fixed pedestal 48. As is most clearly illustrated in FIG. 8, the mid portion of each rod is exposed to present an upwardly-facing bearing surface 49.

At each lateral side of the platform, an extension 50 projects from the end 12 thereof and is formed to provide a downwardly-opening bearing 51 which, as will appear hereinafter, overhangs the surface 49 of the associated rod 13 out of contact therewith when the platform is in normal position, but moves downwardly into hinging engagement with the surface 49 upon initiation of vehicle-dumping movement of the platform 11.

Figure 2:
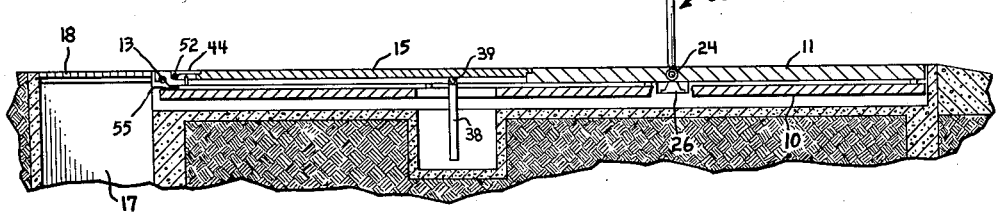
FIG. 2 is a section taken substantially on the line 2—2 of FIG. 1.

An auxiliary platform 15, shorter than the platform 11 is inset in the hinged end of the platform and its end 16 is hingedly supported on a rod 52 supported at its opposite ends upon posts 53 carried by a transverse frame element 54 adjacent the end 12 of the platform 11. It will be apparent that this arrangement permits the platform 15 to swing from its position illustrated in FIG. 2 to its position illustrated in FIG. 3 wholly independently of the platform 11; but that, when the platform 11 swings between its positions of FIGS. 2 and 4, the platform 15 moves with the platform 11.

Near that end of the bed 10 which is adjacent the trunnion means 13, and at each lateral side of the bed, there is provided a rod 55 fixed to, and upstanding from, the bed 10 to present a cylindrical bearing surface arranged upon an axis transverse with respect to the length of the bed. Fixed to the lower surface of the platform 11 for cooperation with each rod 55 is a plate 56 carrying bearing means indicated generally by the reference numeral 57. Each bearing means 57 is formed to provide camming bearing surfaces 58 and 59, flaring oppositely in the direction of length of the platform 11 and toward the bed 10. When the platform 11 is in the position of FIGS. 2 and 7, the weight of the end 12 of said platform is supported from the bed 10 by the engagement of the surfaces 58 and 59 of the bearing means 57 upon the upwardly-presented cylindrical bearing surfaces of the rods 55. Because the surfaces 58 and 59 flare downwardly (or converge upwardly) and coact with cylindrical surfaces of the rods 55, the engaging bearing means 55 and 57 act together to determine the relative position of the platform 11 longitudinally of the bed 10.

The rods 55 and bearing means 57 are so proportioned, designed and located relative to the trunnion means 13 and the downwardly-opening bearings 51 that, when the platform 11 is at rest on the bed 10, said bearings 51 overhang the trunnions 13, out of contact therewith, substantially in the relationship illustrated in FIG. 7.

Immediately to the left of the position of the trunnion means 13, I have illustrated a receiver comprising a pit 17 whose mouth is guarded by a grille 18, and in which is received a conveyor (not shown) for handling material dumped into the pit from a vehicle on either of the platforms 11 or 15. It will be appreciated that the illustrated pit 17 may represent the mouth of a bin, a hopper or the like, depending upon the mode in which material so dumped is to be handled.

In the illustrated embodiment of the invention, the scale bed 10 is disposed within a pit 19 which, according to conventional practice, may be concrete floored and lined; and lifting means for the platform 11, indicated generally by the reference numeral 20, is disposed at each lateral side of the platform in a region suitably spaced from the trunnion means 13.

Figure 6:
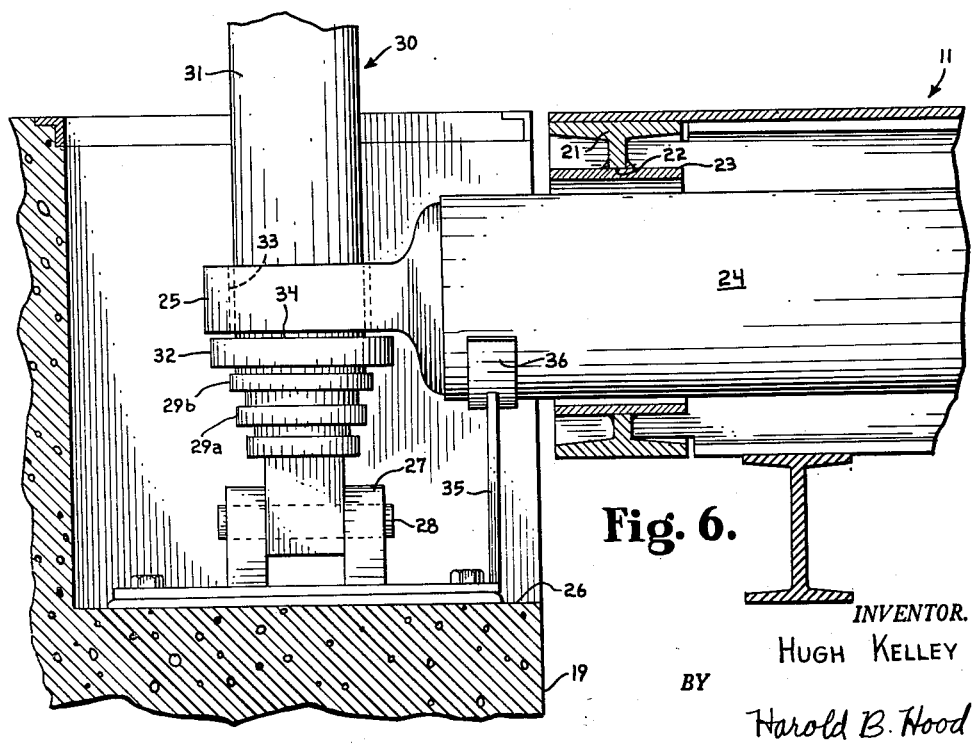
FIG. 6 is a similar section as viewed from the right of FIG. 5.

Referring more particularly to FIG. 6, it will be seen that I have indicated an I-beam 21 constituting a structural element of the platform 11 and extending longitudinally adjacent one lateral edge of the platform; and it will be appreciated that a corresponding beam (not shown) is similarly arranged at the opposite edge of the platform. The detailed structure now to be described is identical at each side of the platform, and therefore has not been duplicated in the drawings.

In the region of the lifting means 20, the web of the I-beam 21 is penetrated by a hole 22 in which is supported, as by welding, a bearing ring 23. A cylindrical beam 24 traverses the platform and its opposite end regions are received in the respective rings 23 which, of course, are coaxially arranged. The beam projects laterally beyond the bearing rings 23 and, at each end, a ring 25 is welded to the beam. As is clearly illustrated in FIG. 6, the external diameter of the beam 24 is significantly less than the internal diameter of the rings 23, thus providing a one-way, releasable lifting connection between the beam 24 and the platform 11.

A shelf 26 at each side of the pit 19 supports a plate carrying a pair of upstanding bearing ears 27 in which is supported a trunnion pin 28 constituting a pivotal anchor for the piston stem 29 of a fluid motor 30 which comprises, in addition to the piston, a cylinder 31. In the illustrated embodiment of the invention, the motor 30 is of the multiple-piston type comprising telescoped piston stems 29, 29a and 29b.

Figure 5:
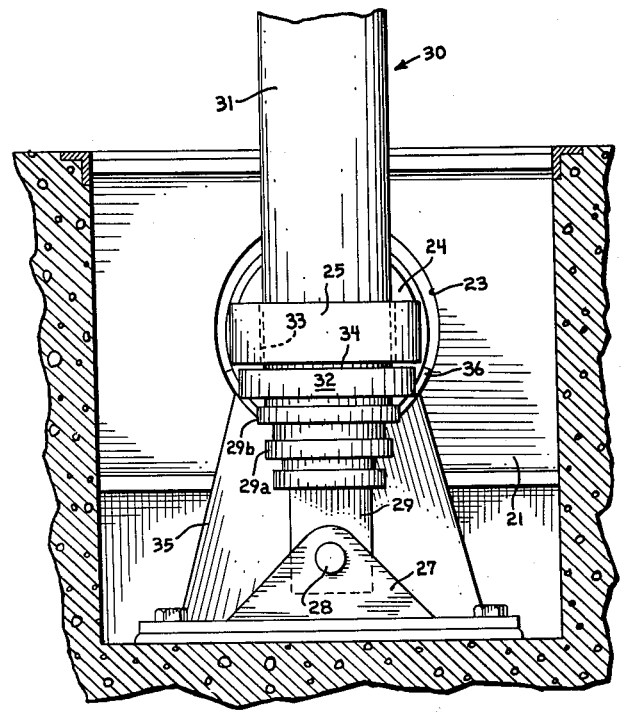
FIG. 5 is a fragmentary section, taken substantially on the line 5—5 of FIG. 1, and drawn to an enlarged scale.

A radial collar 32 is welded to the cylinder 31 adjacent that end thereof from which the piston stems project. As is most clearly to be seen in FIGS. 5 and 6, the internal diameter 33 of the ring 25 significantly exceeds the external diameter of the cylinder 31 so that the ring 25 is loosely sleeved on the cylinder 31 with its lowermost surface facing the upwardly directed surface 34 of the collar 32.

A bracket 35 is likewise secured to the shelf 26 and carries, at its upper end, a cradle 36 conforming in contour to the projecting end of the beam 24.

The several parts just described are so proportioned and arranged that, when the piston of the motor 30 is fully retracted, the surface 34 of the collar 32 is spaced below the ring 25 and the beam 24 is wholly supported upon the cradles 36 adjacent its opposite ends. The platform 11 is wholly supported upon the bed 10, the beam 24 being out of contact with the rings 23, as clearly shown in FIG. 6. Thus, when the platform 11 is in the position of FIG. 2, it is wholly supported upon the scale bed 10, the weight of the beam 24 and of the motors 30 being independently supported from the cradles 36 and the bearings 51 being spaced above the trunnions 13; and the platform 11 may descend slightly, when a load is placed thereon, to actuate the scale without in any way affecting or being affected by the beam 24 and the motors 30 or the fixedly-positioned trunnions 13.

Now, if fluid under pressure is supplied to the motors 30 to extend the pistons 29, the first increment of movement will shift the collars 32 into engagement with the rings 25 to lift the beam 24 off the cradles 36 and into operative engagement with the upper portions of the rings 23. As further fluid is supplied to the motors, the cylinders 31 will continue to rise and the right hand end of the platform 11 will be entrained with the beam 24 to move toward the position of FIG. 4 in which the telescopic piston stem is fully extended. During this movement, the motors 30 rock about their pivotal anchorages 28, and the beam 24 may turn slightly within the rings 23.

As the right-hand end of the platform 11 begins to rise, the rods 55 and the cooperating bearing means 57 act as a fulcrum support for the platform, and the extensions 50, projecting toward the left from the vertical plane including the common axis of the rods 55, will swing downwardly. The parts are so proportioned and designed that, as this movement continues, the arcuate, internal surfaces of the bearings 51 come smoothly into hinging engagement with the exposed, cylindrical surfaces of the trunnions 13, whereby the fulcrum support for the platform is shifted from the bearing means 55—57 to the bearing means 13—51, the entire weight of the platform and its load is removed from the bed 10; and, as the right hand end of the platform 11 moves toward the position of FIG. 4, the entire platform hinges about the axis of the trunnions 13.

After the load has been dumped from the truck 47, fluid is released from the motor cylinders 31 and the right hand end of the platform 11 subsides. As the platform approaches a horizontal position, the bearing means 57 will come into coactive engagement with the rods 55. If, for any reason, the platform is not accurately centered, longitudinally of the bed 10, either the surfaces 58 or the surfaces 59 will first engage the rods 55; and since those surfaces converge upwardly, the first-engaged surfaces will exert a camming action during the final increments of platform subsidence so that, when the platform finally comes to rest on the bed 10, the rods 55 will be accurately centered between the surfaces 58 and 59 as shown in FIG. 7. However, as the weight of the platform end 12 is accepted by the rods 55, the fulcrum support again shifts from the trunnions 13 to those rods; and in those final increments of platform movement, the bearings 51 are again lifted out of contact with the trunnions 13 to the position illustrated in FIG. 7.

In apparatus of the character here under consideration, it is, of course, desirable to minimize the dimension between the point of support of the motors 30 and the uppermost surface of the platform 11; and that end is accomplished by mounting the motors 30 in the manner illustrated, wherein the cylinders 31 are the upwardly movable elements of the motors while the pistons 29 are the motor elements which are anchored on the trunnions 28.

It is also desirable to support the motors 30, their connecting lines and their control devices, independently of the platform so that their weight shall not affect the action of the platform upon the scale bed; and that end is accomplished by providing the lost-motion connection between the beam 24 and the platform. Still further, it is desirable to relieve the motors and their trunnions of any excess weight while they are inactive; and that end is accomplished by providing the cradles 36 which sustain the beam when the motor pistons are fully retracted.

For independently actuating the platform 15, I provide lifting means indicated generally by the reference numeral 37. Such lifting means comprises a pair of fluid motors 38, each including a cylinder trunnion mounted, near its upper end as at 39, upon an element 40 of the main platform 11, and a telescopic piston 42 the upper end of which is hinged as at 43 to bearing means fixed adjacent the distal end of the platform 15.

Figure 3:
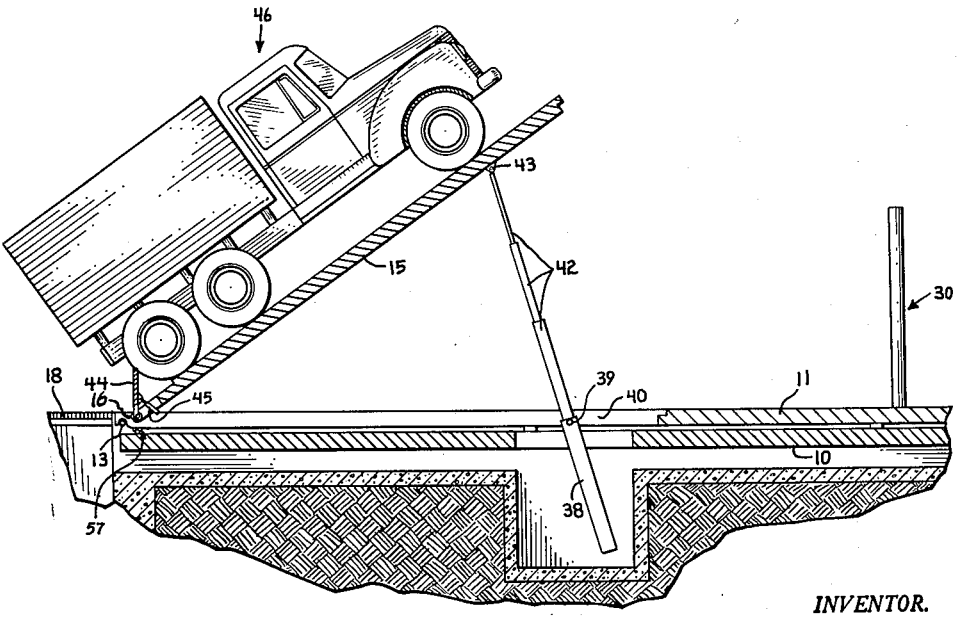
FIG. 3 is a fragmentary longitudinal section, drawn to an enlarged scale, and showing the auxiliary platform in elevated position with a vehicle supported thereon.
Figure 4:
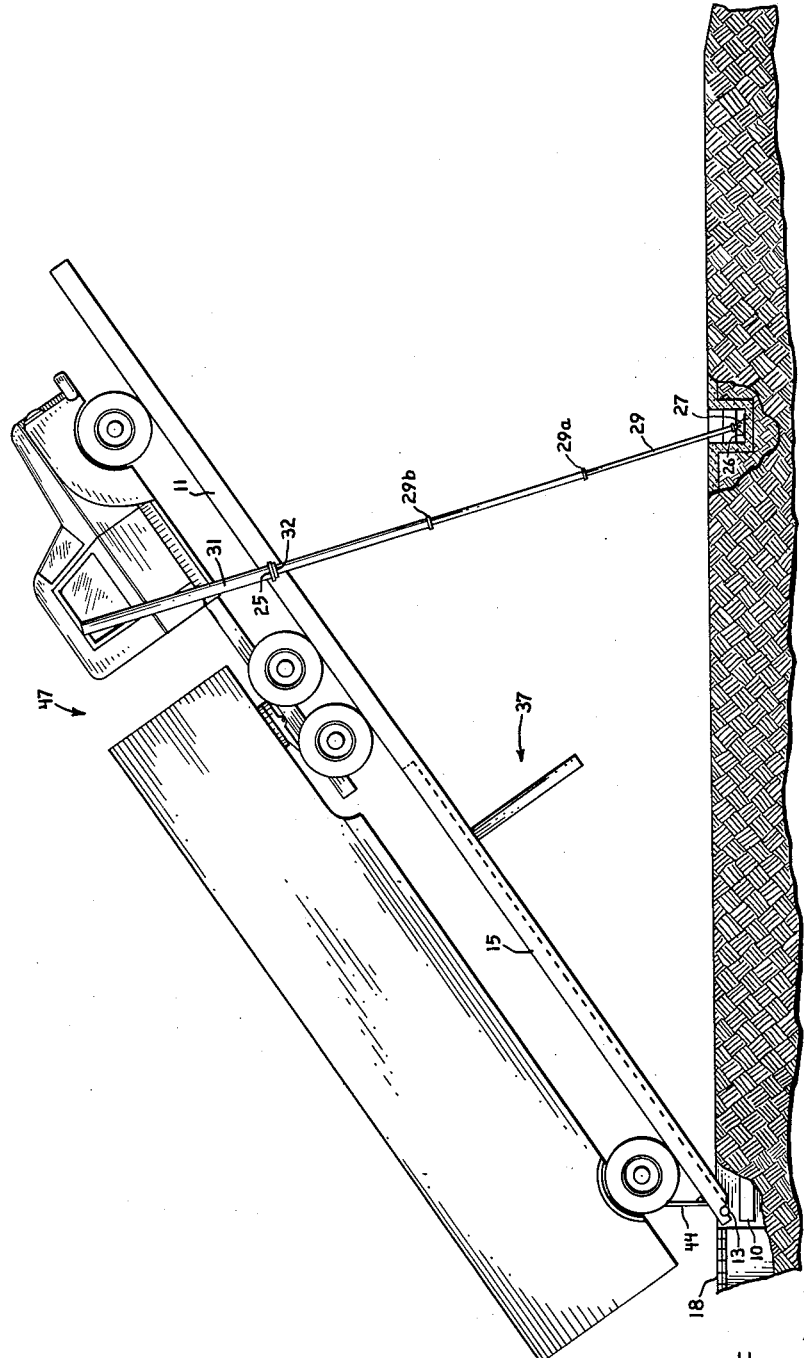
FIG. 4 is a view similar to FIG. 3 and showing the main platform in elevated position with a vehicle supported thereon.

Blocker means 44 under the control of fluid motor means 45 is mounted near the proximal end of the platform 15 and may be raised into coacting relation either with a small truck 46 supported on the platform 15 when the latter is in the position of FIG. 3 or with a large truck 47 supported on the main platform 11 when the latter is in the position of FIG. 4. Preferably, and as shown, the blocker means 44 is hinged at a point significantly spaced to the right from the axis of the trunnion means 13 as, for instance, on the rod 52. If the hinge axis for the blocker too closely approaches the hinge axis for the platform 11, bumpers or spare tires carried at the rear ends of trucks will frequently strike the grate 18 when the truck is raised to dumping position; and the illustrated arrangement guards against such a contingency.

The specific arrangement whereby the fulcrum support for the platform shifts, during operation, between the bearing means 55—57 and the bearing means 13—51 is of primary importance since it guards against accumulation of foreign material within the primary hinge connection for the platform 11. Because the bearing surfaces 51 lift away from the trunnions 13 each time the platform 11 descends onto the bed 10, and particularly because the surfaces 51 are turning relative to the surfaces of the trunnion as they are so lifted, and because a reverse action occurs each time the bearing surfaces return to hinging engagement with the trunnions, any foreign material which may fall onto the trunnion surfaces from trucks being dumped or from any other source will be wiped away and therefore will not accumulate to cause inaccurate weighing. This self-cleaning feature is a distinct improvement over previously-known apparatus of the general character here under consideration.

I claim as my invention:

1. Vehicle dumping apparatus comprising bed means, a platform substantially coextensive with said bed, adapted to rest thereon and hingedly mounted adjacent one end thereof for swinging movement relative to said bed about a substantially horizontal axis, a beam horizontally traversing said platform at a point spaced from said axis, said beam being substantially parallel with said axis, wholly below the uppermost surface of said platform and having a lost-motion lifting connecting with said platform, support means located at opposite sides of said platform and independent of said bed and said platform, said support means being constructed and arranged to support said beam, when said platform rests on said bed, out of contact with said platform, and lifting means located at opposite sides of said platform and actuable, at times, to engage and lift said beam off said support means and into lifting engagement with said platform to swing said platform about said axis, and at other times to withdraw from supporting relation with said beam.

2. In combination, bed means, a platform hingedly mounted at one end about a horizontal axis and adapted to rest on said bed means, transversely-spaced ring means fixedly secured to said platform, the axis of each ring means being substantially parallel with said first-named axis, beam means arranged within said ring means, the vertical dimension of said beam means being significantly less than the vertical dimension of said ring means whereby said beam means and said platform are relatively movable vertically, support means independent of said bed means and said platform, and lifting means supported independently of said bed and of said platform adjacent each ring means and operatively engageable with said beam means to swing said platform upwardly about said first-named axis, said lifting means being movable to a position in which said beam means is out of supporting engagement with said ring means and is supported wholly on said support means while said platform rests on said bed means.

3. In combination with a bed and a platform constructed and arranged to rest on said bed but hingedly mounted at one end to swing about a horizontal axis, lifting means for said platform comprising two fluid motors supported independently of said bed and platform and located respectively adjacent opposite sides of said platform, each such motor comprising a cylinder element and a piston element having a stem projecting from one end of its cylinder element, a pair of rings fixed to said platform in laterally-spaced, transversely coaxial alignment, a beam having portions disposed within said rings and projecting oppositely laterally therebeyond, the diameters of said beam portions being significantly less than the internal diameters of said rings, one element of each motor being anchored upon a pivotal axis substantially parallel with said first-named axis and the other element of each motor being constructed and arranged to move upwardly under the influence of fluid under pressure supplied to said motor, the last-named element of each motor being operatively engageable with the adjacent lateral projection of said beam to lift said beam to swing said platform upwardly about said first-named axis and being movable downwardly to a position in which said beam is out of lifting engagement with said rings and said platform rests on said bed.

4. The combination of claim 3 in which the cylinder is the upwardly movable element of each motor, radial abutment means fixed to each cylinder closely adjacent said one end thereof, and abutment means on each lateral projection of said beam straddling the adjacent motor cylinder and disposed for engagement by the upper surface of the associated cylinder abutment.

5. The combination of claim 3 in which the cylinder is the upwardly movable element of each motor, a collar fixed to each cylinder closely adjacent said one end thereof, and a ring fixed to each lateral projection of said beam and loosely sleeved on the adjacent motor cylinder above said collar.

6. In combination with a bed and a platform constructed and arranged to rest on said bed but hingedly mounted at one end to swing about a horizontal axis, lifting means for said platform comprising two fluid motors supported independently of said bed and platform and located respectively adjacent opposite sides of said platform, each such motor comprising a cylinder and a piston having a stem projecting from one end of its cylinder, the piston stem of each motor being anchored upon a pivotal axis substantially parallel with said first-named axis, a collar fixed to each cylinder closely adjacent said one end thereof, and a ring at each lateral side of said platform, operatively connected with said platform and loosely sleeved on the adjacent motor cylinder above said collar.

7. In combination with a bed and a platform constructed and arranged to rest on said bed but hingedly mounted at one end to swing about a horizontal axis, lifting means for said platform comprising two fluid motors supported independently of said bed and platform and located respectively adjacent opposite sides of said platform, each such motor comprising a cylinder and a piston having a stem projecting from one end of its cylinder, the piston stem of each motor being anchored upon a pivotal axis substantially parallel with said first-named axis, a collar fixed to each cylinder closely adjacent said one end thereof, beam means operatively connected with said platform, and a ring carried by said beam means and located laterally beyond each side of said platform, each such ring being loosely sleeved on the adjacent motor cylinder above said collar.

8. Vehicle dumping apparatus comprising bed means, trunnion means supported adjacent an end of said bed means upon an axis transverse with respect to the length of said bed means, a platform adapted to rest on said bed and provided with downwardly-open bearing means proportioned and arranged, when said platform rests on said bed means, to overhang said trunnion means, a beam horizontally traversing said platform adjacent the other end thereof, said beam being substantially parallel with said trunnion axis, wholly below the uppermost surface of said platform and having a lost-motion lifting connection with said platform, support means located at opposite sides of said platform and independent of said bed and said platform, said support means being constructed and arranged to support said beam, when said platform rests on said bed, out of contact with said platform, lifting means located at opposite sides of said platform and actuable, at times, to engage and lift said beam off said support means and into lifting engagement with said platform to lift said other end of said platform, and mutually-coactive means on said bed and on said platform for accurately positioning said platform relative to said bed when said platform rests on said bed, said bearing means being constructed and arranged to swing downwardly into hinging engagement with said trunnion means upon initiation of lifting movement of said other end of said platform.

9. Vehicle dumping apparatus comprising bed means, trunnion means supported adjacent an end of said bed means upon an axis transverse with respect to the length of said bed means, a platform adapted to rest on said bed and provided with downwardly-open bearing means proportioned and arranged, when said platform rests on said bed means, to overhang and enshroud said trunnion means out of contact therewith to protect said trunnion means against foreign matter, lifting means arranged adjacent the other end of said platform and movable downwardly into a position wholly out of contact with said platform and upwardly to engage and lift said other end of said platform, and mutually-coactive means on said bed and on said platform for accurately positioning said platform relative to said bed when said platform rests on said bed, said bearing means being constructed and arranged to swing downwardly into hinging engagement with said trunnion means upon initiation of lifting movement of said other end of said platform.

10. In combination, bed means, trunnion means supported adjacent an end of said bed means upon an axis transverse with respect to the length of said bed means, a platform adapted to rest on said bed means and provided at its end adjacent said trunnion means with downwardly-opening bearing means proportioned and arranged, when said platform rests on said bed means, to overhang said trunnion means out of contact therewith, transversely-spaced ring means fixedly secured to said platform at a position longitudinally remote from said bearing means, the axis of each ring means being substantially parallel with said first-named axis, beam means arranged within said ring means, the vertical dimension of said beam means being significantly less than the vertical dimension of said ring means whereby said beam means and said platform are relatively movable vertically, lifting means supported independently of said bed and of said platform adjacent each ring means and operatively engageable with said beam means to lift that end of said platform remote from said bearing means, said lifting means being movable to a position in which said beam means is out of supporting engagement with said ring means and said platform rests on said bed means, and mutually-coactive means on said bed means and on said platform for accurately positioning said platform relative to said bed means when said platform rests on said bed means, said bearing means being constructed and arranged to swing downwardly into hinging engagement with said trunnion means upon initiation of lifting movement of said remote end of said platform.

11. In combination, bed means, trunnion means supported, independently of said bed means, adjacent an end of said bed means upon an axis transverse relative to the length of said bed means, means carried by said bed means and providing an upwardly-facing bearing surface arranged on an axis substantially parallel with said first-named axis, a platform adapted to be supported from said bed means, means carried by said platform and providing a downwardly-facing bearing surface engageable with said upwardly-facing bearing surface to support said platform when said platform rests on said bed means, said engageable bearing surfaces constituting a fulcrum support for that end of said platform adjacent said trunnion means, power lift means operatively associated with the other end of said platform, further downwardly-opening bearing means projecting from said first-named end of said platform and constructed and arranged to overhang and enshroud said trunnion means out of contact therewith to protect said trunnion means against foreign matter when said platform rests wholly on said bed means, but to swing downwardly about said fulcrum support into hinging engagement with said trunnion means upon initiation of upward movement of said other platform end under the influence of said power lift means.

12. The combination of claim 11 in which one of said engageable bearing surfaces flares oppositely in the direction of length of said bed means and toward the other of said engageable bearing surfaces.

13. In combination, bed means, trunnion means supported independently of said bed means adjacent one end thereof upon an axis transverse with respect to the length of said bed means, power lift means supported independently of said bed means adjacent the other end thereof, means carried on said bed means adjacent the first-named end thereof and providing a part-cylindrical, upwardly-directed bearing surface disposed upon an axis parallel with said first-named axis, a platform, means carried by said platform and providing a bearing surface flaring oppositely in the direction of length of said bed means and toward said bed means, said last-named surface being engageable with said first-named surface to provide a fulcrum support for one end of said platform from said bed means, said power lift means having a one-way, disengageable operative connection with said platform adjacent the other end thereof, downwardly-opening bearing means fixed to and projecting from said one platform end, said trunnion means, said bed-carried means, said platform-carried means and said downwardly-opening bearing being so proportioned and arranged that, when said platform rests wholly on said bed with said platform-carried means supported by said bed-carried means, said downwardly-opening bearing means will overhang and enshroud said trunnion means out of contact therewith to protect said trunnion means against foreign matter, and when said power lift means raises said other end of said platform, said platform will swing about said fulcrum support to move said downwardly-opening bearing means into hinging engagement with said trunnion means.

References Cited in the file of this patent

UNITED STATES PATENTS

| 508,158 | Wilson | Nov. 7, 1893 |
| 1,255,313 | Hurst et al. | Feb. 5, 1918 |
| 1,387,036 | Benson et al. | Aug. 9, 1921 |
| 1,390,368 | Mann | Sept. 13, 1921 |
| 1,392,075 | Neale | Sept. 27, 1921 |
| 2,655,115 | Holdeman et al. | Oct. 13, 1953 |

FOREIGN PATENTS

| 360,970 | Germany | Oct. 9, 1922 |

UNITED STATES PATENT OFFICE

CERTIFICATE OF CORRECTION

Patent No. 3,075,660 January 29, 1963

Hugh Kelley

It is hereby certified that error appears in the above numbered patent requiring correction and that the said Letters Patent should read as corrected below.

Column 5, line 41, for "connecting" read -- connection --.

Signed and sealed this 20th day of August 1963.

(SEAL)
Attest:

ERNEST W. SWIDER
Attesting Officer

DAVID L. LADD
Commissioner of Patents